(12) United States Patent
Ikeda et al.

(10) Patent No.: US 8,854,797 B2
(45) Date of Patent: Oct. 7, 2014

(54) POWER SOURCE CIRCUIT SHUT OFF APPARATUS

(75) Inventors: Tomohiro Ikeda, Makinohara (JP); Hiroyuki Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 247 days.

(21) Appl. No.: 13/410,530

(22) Filed: Mar. 2, 2012

(65) Prior Publication Data

US 2012/0224309 A1 Sep. 6, 2012

(30) Foreign Application Priority Data

Mar. 4, 2011 (JP) ................................ 2011-048329

(51) Int. Cl.
| | |
|---|---|
| *H02B 1/04* | (2006.01) |
| *H01H 9/08* | (2006.01) |
| *H01M 2/34* | (2006.01) |
| *H01M 2/20* | (2006.01) |
| *H01M 2/10* | (2006.01) |
| *H01H 3/04* | (2006.01) |
| *H01R 13/62* | (2006.01) |
| *H01M 6/42* | (2006.01) |
| *H01H 21/30* | (2006.01) |

(52) U.S. Cl.
CPC .............. *H01M 2/206* (2013.01); *H01H 9/085* (2013.01); *H01M 2/34* (2013.01); *H01M 2/1077* (2013.01); *H01H 21/30* (2013.01); *Y02E 60/12* (2013.01)
USPC ........... 361/643; 200/335; 439/157; 439/188; 429/159; 361/624

(58) Field of Classification Search
USPC ................................................ 361/600–678
See application file for complete search history.

(56) References Cited

U.S. PATENT DOCUMENTS

| | | | | |
|---|---|---|---|---|
| 6,619,970 B2* | 9/2003 | Fukushima et al. | ........... | 439/157 |
| 6,982,393 B2* | 1/2006 | Matsui et al. | ................. | 200/335 |
| 7,125,268 B1* | 10/2006 | Marukawa et al. | ........... | 439/133 |
| 7,863,781 B2* | 1/2011 | Marukawa et al. | ........... | 307/326 |
| 7,872,206 B2* | 1/2011 | Matsunaga et al. | ........... | 200/335 |

(Continued)

FOREIGN PATENT DOCUMENTS

| | | |
|---|---|---|
| CN | 100539252 C | 9/2009 |
| JP | 2005-142107 A | 6/2005 |
| JP | 2007-48515 A | 2/2007 |

(Continued)

OTHER PUBLICATIONS

Office Action, dated Dec. 4, 2014, issued by the State Intellectual Property Office of the People's Republic of China, in counterpart Application No. 201210054169.6.

Office Action issued Jul. 9, 2014, issued by the Patent Office of the People's Republic of China, in counterpart Application No. 201210054169.6.

*Primary Examiner* — Zachary M Pape

(74) *Attorney, Agent, or Firm* — Sughrue Mion, PLLC

(57) ABSTRACT

A power source circuit shut off apparatus shuts off a circuit of a battery assembly in which plural battery cells connected in series are arranged in parallel. The power source circuit shut off apparatus includes a housing, a pair of bus bars that is arranged in the housing and is connected to the adjacent battery cells respectively, a switch section that is adapted to conduct electrical connection or disconnection between the pair of bus bars, and a retaining member which is formed on the housing and is configured to be retained to a resin frame part of a side surface of the battery cell.

3 Claims, 5 Drawing Sheets

(56) References Cited

U.S. PATENT DOCUMENTS

| | | |
|---|---|---|
| 8,379,375 B2 * | 2/2013 | Furuya et al. ............... 361/642 |
| 2002/0086578 A1 | 7/2002 | Ikeda |
| 2005/0098419 A1 | 5/2005 | Matsui et al. |
| 2007/0141457 A1 | 6/2007 | Amagai |
| 2009/0017368 A1 | 1/2009 | Hayashi et al. |
| 2010/0323236 A1 * | 12/2010 | Kosaki et al. ............... 429/159 |

FOREIGN PATENT DOCUMENTS

| | | |
|---|---|---|
| JP | 2007-317400 A | 12/2007 |
| JP | 2009-187813 A | 8/2009 |
| JP | 2009-289431 A | 12/2009 |

* cited by examiner

POWER SOURCE CIRCUIT SHUT OFF APPARATUS

CROSS-REFERENCE TO RELATED APPLICATIONS

This application claims the benefit of Application No. JP 2011-048329 filed Mar. 4, 2011, in the Japanese Patent Office (JPO), the disclosure of which is incorporated herein in its entirety.

BACKGROUND

The present invention relates to a power source circuit shut off apparatus for shutting off a circuit of a power source mounted in a vehicle such as an electric vehicle or a hybrid car.

An electric vehicle or a hybrid car is increasing as an environmentally-friendly automobile. A power source apparatus including a battery assembly obtained by stacking plural batteries is mounted in such a vehicle (for example, see Patent Literatures 1 to 4).

Since the power source apparatus mounted in such a vehicle such as the electric vehicle or the hybrid car has larger capacity than a power source circuit of a gasoline engine vehicle etc., work safety is ensured by shutting off a power source circuit between the power source apparatus and a load by a power source circuit shut off apparatus at the time of repair or maintenance of an electrical system and so on (for example, see Patent Literature 5).

CITATION LIST

Patent Literature

[PTL 1] JP-A-2007-48515
[PTL 2] JP-A-2007-317400
[PTL 3] JP-A-2009-187813
[PTL 4] JP-A-2009-289431
[PTL 5] JP-A-2005-142107

Incidentally, in the power source apparatus, plural batteries are connected in series and a voltage between both of the total electrode terminals of the power source apparatus is a high voltage. Because of this, in the case of doing maintenance work even when the power source circuit between the power source apparatus and the bad is shut off by the power source circuit shut off apparatus, sufficient care must be taken so as not to make contact with the power source apparatus itself (both of the total electrode terminals), and a burden on a maintenance worker was great.

SUMMARY

The invention has been implemented in view of the circumstances described above, and an object of the invention is to provide a power source circuit shut off apparatus capable of ensuring higher safety at the time of maintenance work while minimizing a burden on a maintenance worker.

The object according to the invention is achieved by the following configuration.

(1) A power source circuit shut off apparatus for shutting off a circuit of a battery assembly in which plural battery cells connected in series are arranged in parallel, comprising:
a housing;
a pair of bus bars that is arranged in the housing and is connected to the adjacent battery cells respectively;
a switch section that is adapted to conduct electrical connection or disconnection between the pair of bus bars; and
a retaining member which is formed on the housing and is configured to be retained to a resin frame part of a side surface of the battery cell.

According to this power source circuit shut off apparatus, the bus bars are connected to the adjacent battery cells in the battery assembly and disconnection between these bus bars is made by the switch section, so that an open circuit voltage between both of the total electrodes of the battery assembly can be made zero when the portion between the bus bars is shut off by the switch section. Therefore, in order to do repair or maintenance of a load to which electric power is supplied from the battery assembly, safety in the case of disconnecting the battery assembly from the load can be enhanced greatly and a burden on a worker can be minimized.

Also, the bus bars connected to the battery cells are included, so that the need for a wire harness in which the extra length portion in a conventional apparatus must be protected by a case etc. can be eliminated, and cost can be reduced by reducing the number of components and simplifying a structure, and also recyclability can be improved.

Further, the housing is locked and attached to the resin frame part of the side surface of the battery cell by the retaining member, so that an external force at the time of operation of the switch section is received by the resin frame part. Hence, the external force at the time of operation can be prevented from being applied to a place of connection between the battery cells and the bus bars, and damage to the battery cells from the external force at the time of operation can be eliminated.

(2) In the power source circuit shut off apparatus of (1), the retaining member has a claw part which is projected from the housing and is locked in a locking hole formed in the resin frame part of the side surface of the battery cell.

According to this power source circuit shut off apparatus, the claw part of the housing is locked in the locking hole of the resin frame part of the side surface of the battery cell and thereby, the claw part can be attached to the resin frame part extremely easily without using a dedicated bracket etc.

(3) In the power source circuit shut off apparatus of (1) or (2), a power source circuit shut off apparatus further includes the switch section includes an interlock switch which switches to open or close a main circuit of the battery assembly in a state that the electrical connection is conducted between the bus bars.

According to this power source circuit shut off apparatus, at the time of maintenance or repair, the interlock switch changes to an off state and the main circuit becomes open, so that work safety can be enhanced more.

(4) In the power source circuit shut off apparatus of (3), the power source circuit shut off apparatus further includes switch plug which has a connecting terminal for conducting the electrical connection between the bus bars and is fitted into the housing; and a lever which is turnably attached to the switch plug and is turned when the switch plug is completely fitted into the housing, wherein the interlock switch is actuated by a turning operation of the lever.

According to this power source circuit shut off apparatus, unless the switch plug is completely fitted into the housing, the lever cannot be turned to operate the interlock switch, so that the interlock switch can be inhibited from being operated in a state of incompletely fitting the switch plug into the housing, and safety can be enhanced.

According to the power source circuit shut off apparatus according to the invention, the power source circuit shut off apparatus capable of ensuring higher safety at the time of maintenance work while minimizing a burden on a maintenance worker can be provided.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

An embodiment according to the invention will hereinafter be described with reference to the drawings.

Figure 1:
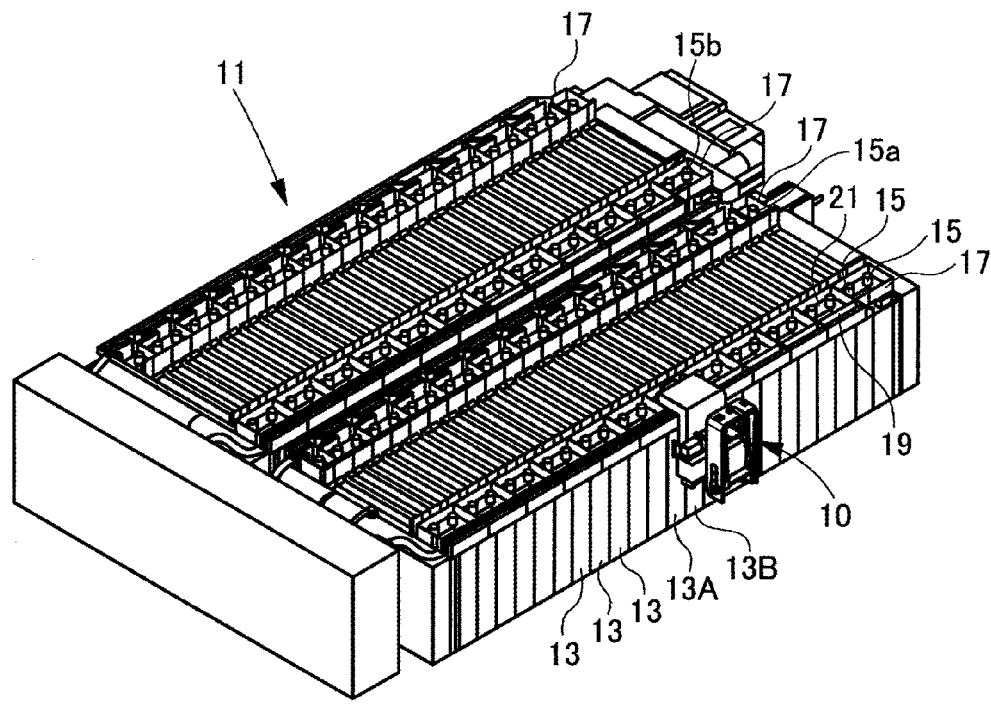
FIG. 1 is a perspective view of a battery assembly including a service plug according to an embodiment.
Figure 2:
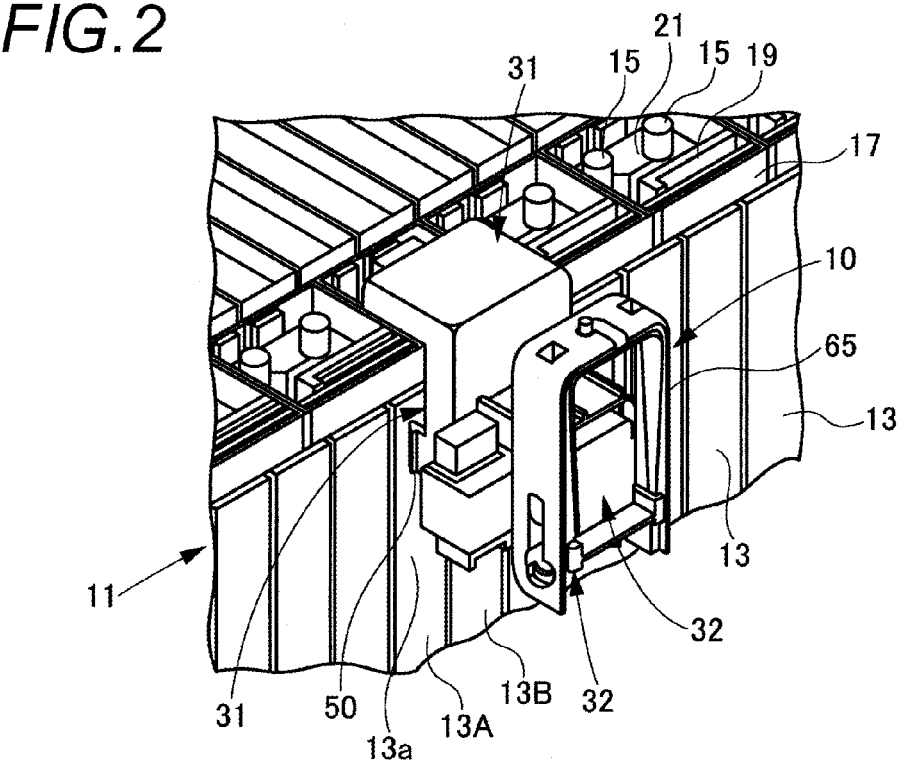
FIG. 2 is an enlarged perspective view showing a main part of FIG. 1.
Figure 3:
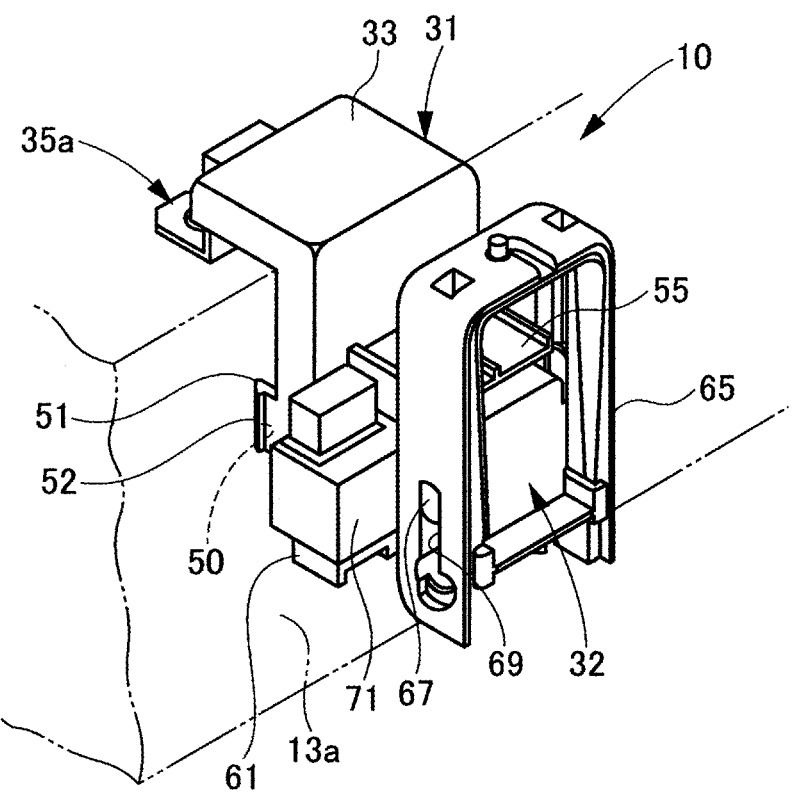
FIG. 3 is a perspective view of the service plug.
Figure 4:
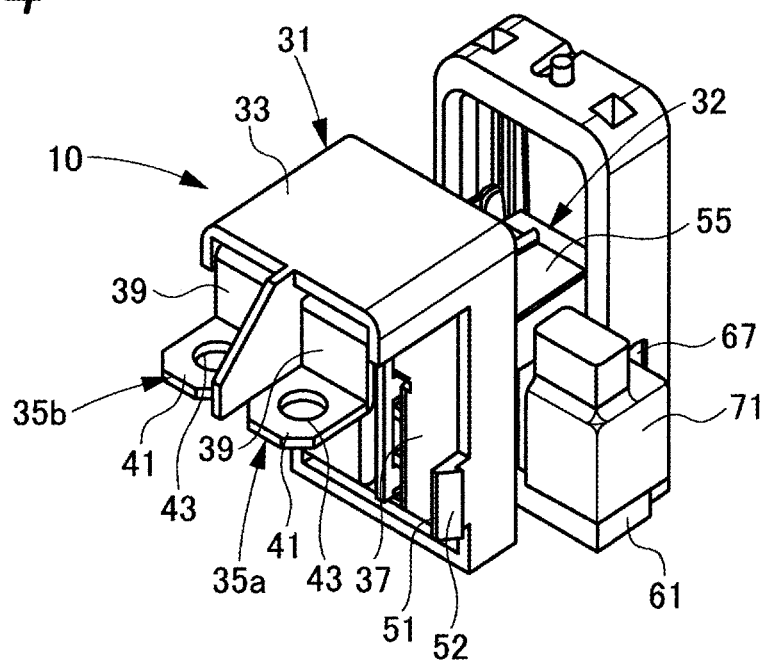
FIG. 4 is a perspective view seen from the side of attachment of the service plug to a battery.
Figure 5:
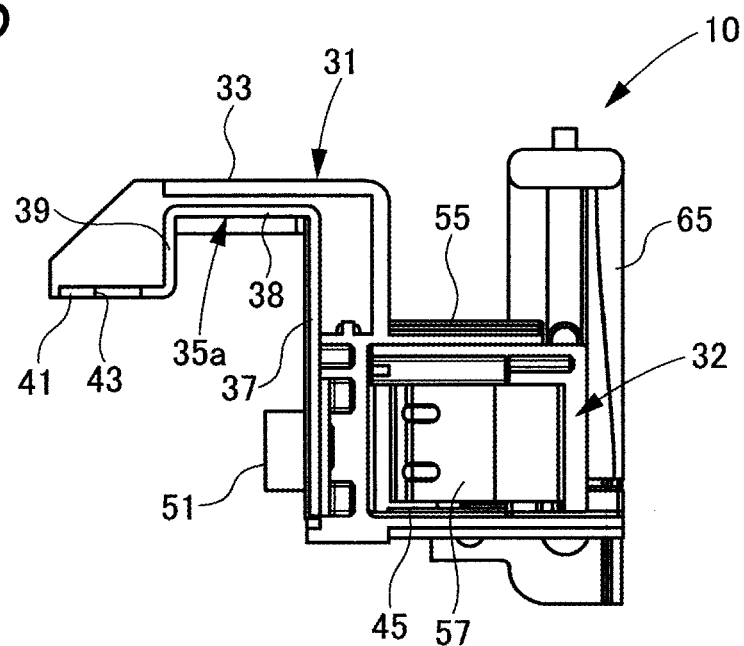
FIG. 5 is a sectional view of the service plug.
Figure 6:
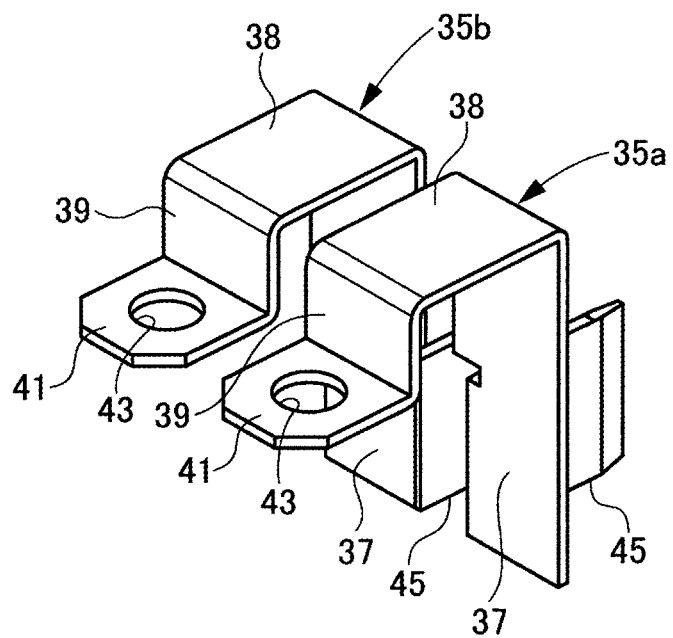
FIG. 6 is a perspective view of bus bars provided on the service plug.
Figure 7:
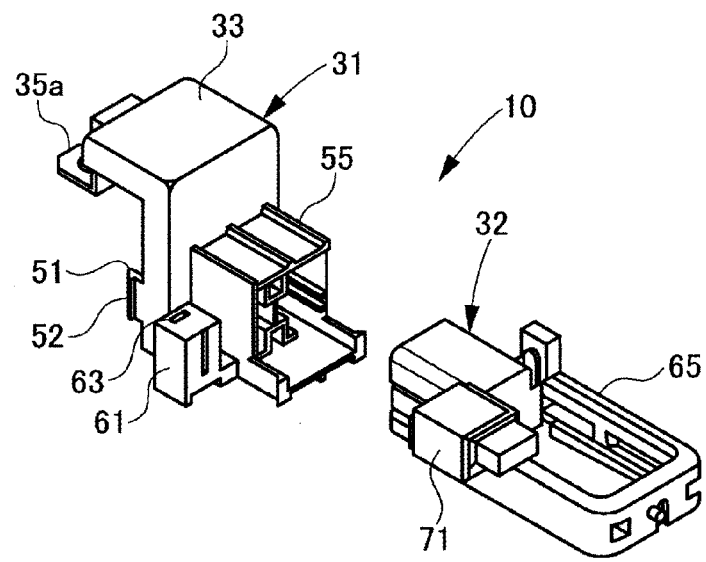
FIG. 7 is a perspective view describing a method of operation of the service plug.
Figure 8:
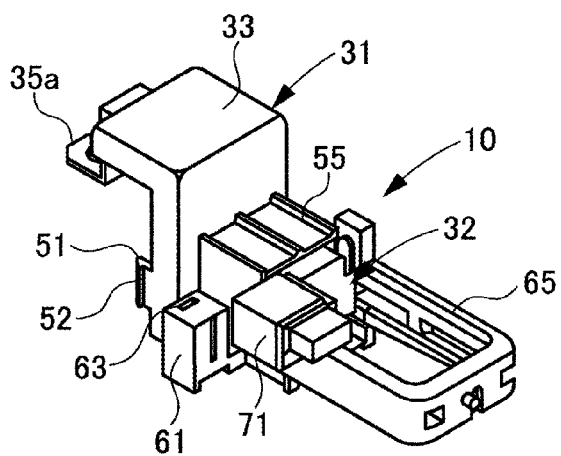
FIG. 8 is a perspective view describing a method of operation of the service plug.
Figure 9:
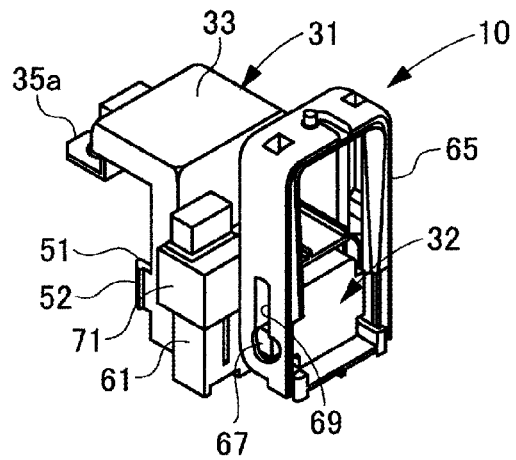
FIG. 9 is a perspective view describing a method of operation of the service plug.

FIG. 1 is a perspective view of a battery assembly including a service plug according to the present embodiment, and FIG. 2 is an enlarged perspective view showing a main part of FIG. 1, and FIG. 3 is a perspective view of the service plug, and FIG. 4 is a perspective view seen from the side of attachment of the service plug to a battery, and FIG. 5 is a sectional view of the service plug, and FIG. 6 is a perspective view of bus bars provided on the service plug, and FIGS. 7 to 9 are perspective views describing a method of operation of the service plug.

As shown in FIG. 1, a battery assembly 11 in which a service plug (a power source circuit shut off apparatus) 10 is installed is mounted as a power source apparatus of a vehicle such as an electric vehicle or a hybrid car, and is constructed by juxtaposing plural rectangular batteries (battery cells) 13 in two lines. In these batteries 13, respective terminals 15 are arranged on upper surfaces and resin-made battery connecting plates 17 are attached to lines of these terminals 15.

As shown in FIG. 2, the battery connecting plates 17 have plural bus bar attachment parts 19, and bus bars 21 made of conductive metal plates are fitted into these bus bar attachment parts 19. The terminals 15 of the stacked adjacent batteries 13 are respectively inserted into a pair of connecting holes formed in these bus bars 21. Then, continuity connection between the terminals 15 is made through the bus bars 21 of the battery connecting plates 17 by fastening nuts (not shown) to the terminals 15 of the batteries 13.

In the battery assembly 11, all the batteries 13 are connected in series, and a total positive-electrode terminal 15a and a total negative-electrode terminal 15b of the batteries 13 are connected to various loads and electric power is supplied.

In the battery assembly 11 configured as described above, for example, the service plug (the power source circuit shut off apparatus) 10 for shutting off a circuit of the battery assembly 11 is attached to the terminals 15 of mutually adjacent batteries 13A, 13B in the arranged middle portion instead of the bus bars 21.

As shown in FIGS. 3 to 5, the service plug 10 includes a plug body 31, and a switch plug (a switch section) 32 attached to and detached from this plug body 31.

The plug body 31 has a housing 33 made of synthetic resin, and a set of bus bars 35a, 35b held in this housing 33.

As shown in FIG. 6, the bus bars 35a, 35b are formed by, for example folding a conductive metal plate such as copper or copper alloy. The bus bars 35a, 35b have upper plate parts 38 laterally bent from the upper ends of bus bar bodies 37 extending vertically, side plate parts 39 downwardly bent from the tops of the upper plate parts 38, and fixing piece parts 41 laterally bent from the tops of the side plate parts 39.

A connecting hole 43 with a diameter slightly larger than the terminal 15 of the battery 13 is formed in the fixing piece part 41, and the terminal 15 of the battery 13 is inserted into this connecting hole 43.

Also, in the bus bars 35a, 35b, connecting pieces 45 are formed in lateral parts of the mutual proximal sides in the respective bus bar bodies 37, and the respective connecting pieces 45 are mutually opposed and arranged in parallel.

The bus bars 35a, 35b are held in the housing 33 in parallel mutually, and the outer surface sides of the side plate parts 39, the upper plate parts 38 and the bus bar bodies 37 are covered with this housing 33.

Also, a set of locking pieces (retaining members) 51 projecting from both lateral parts of the housing 33 to the attachment side of the battery 13 are formed in the plug body 31. Claw parts (retaining member) 52 projecting outwardly are formed in the tops of these locking pieces 51.

Further, in the plug body 31, a fitting part 55 is formed in the back opposite to the battery side and the switch plug 32 can be fitted into this fitting part 55. The respective connecting pieces 45 of the bus bars 35a, 35b are stored inside the fitting part 55.

A connecting terminal 57 formed in a U shape in plan view is built into the switch plug 32 and when the switch plug 32 is fitted into the fitting part 55 of the plug body 31, the connecting terminal 57 of the switch plug 32 is attached so as to pinch the connecting pieces 45 of the bus bars 35a, 35b from the outside. Consequently, continuity connection between the bus bars 35a, 35b is made through the connecting terminal 57.

That is, in the service plug 10, the fitting part 55 of the plug body 31 is used as a switch section and the switch plug 32 is inserted and withdrawn and thereby, electrical connection and disconnection between the bus bars 35a, 35b are made by the connecting terminal 57.

Also, the plug body 31 includes an interlock switch 61 as shown in FIG. 7. This interlock switch 61 is a switch for opening and closing a main circuit of the battery assembly 11. When this interlock switch 61 changes to an on state, the main circuit becomes a closed circuit by a relay (not shown) provided on the main circuit, and electric power of the battery assembly 11 is supplied to various loads. Also, when the interlock switch 61 changes to an off state, the main circuit becomes an open circuit by the relay provided on the main circuit, and supply of the electric power of the battery assembly 11 to various loads is shut Off.

This interlock switch 61 is provided on a lateral part of the fitting part 55 and is projected upwardly, and the inside of the interlock switch 61 is provided with a pair of terminals (not shown). Also, an insertion hole 63 is formed in an upper portion of this interlock switch 61.

The switch plug 32 includes a lever 65. This lever 65 is coupled to the switch plug 32 turnably around a horizontal axis line. This lever 65 can turn upwardly as shown in FIG. 9 in a state of completely fitting the switch plug 32 into the fitting part 55 of the plug body 31 as shown in FIG. 8. That is, this lever 65 is coupled turnably around a support shaft 67 horizontally projected from a lateral part of the switch plug 32. Then, when this lever 65 is turned upwardly, this lever 65 is arranged vertically.

The support shaft 67 is formed in a vertically elongated shape with a right-and-left width dimension formed small. Also, a groove part 69 into which the support shaft 67 of the switch plug 32 is inserted is formed in the lever 65, and this groove part 69 is formed slightly larger than the right-and-left width dimension of the support shaft 67 and smaller than a height dimension orthogonal to the width dimension of the support shaft 67. Consequently, when the lever 65 is turned upwardly around the support shaft 67 and this lever 65 is arranged vertically, the support shaft 67 can move inside the groove part 69. Therefore, when the lever 65 is arranged vertically, this lever 65 can move downwardly.

A short terminal part 71 having a hole part in the downward side is had integrally to one lateral part of the lever 65. A short terminal (not shown) is built into the inside of this short terminal part 71, and this short terminal is arranged inside the hole part.

When the lever 65 arranged vertically is moved downwardly, the interlock switch 61 is fitted into the short terminal part 71 after the short terminal part 71 approaches the interlock switch 61. Consequently, the short terminal of the short terminal part 71 is inserted into the insertion hole 63 of the interlock switch 61, and a pair of terminals of the inside of the interlock switch 61 is brought into conduction.

The service plug 10 with the structure described above is attached between the mutually adjacent batteries 13 in a predetermined position of the battery assembly 11.

In the case of attaching this service plug 10 to the battery assembly 11, first, the service plug 10 is disposed in the battery assembly 11 so that the terminals 15 of the mutually adjacent batteries 13A, 13B in a predetermined position are inserted into the connecting holes 43 of the fixing piece parts 41 of the bus bars 35a, 35b in a state of detaching the switch plug 32 to obtain only the plug body 31.

Next, when the plug body 31 is pressed on a side surface of the battery assembly 11, the locking pieces 51 of the plug body 31 enter locking holes 50 formed in resin frame parts 13a of side surfaces of the batteries 13 constructing the battery assembly 11, and the claw parts 52 of the locking pieces 51 are locked in edge parts of the locking holes 50. Consequently, the plug body 31 of the service plug 10 is attached to the battery assembly 11. In addition, at this time, the fixing piece parts 41 of the bus bars 35a, 35b are not fastened to the terminals 15 of the batteries 13, so that an external force is not applied to the terminal 15 even when the plug body 31 is pressed on the side surface of the battery assembly.

Then, the bus bars 35a, 35b are fastened to the terminals 15 by fastening nuts to the terminals 15 of the batteries 13 inserted into the connecting holes 43 of the fixing piece parts 41.

After the plug body 31 is attached to the batteries 13 in this manner, the switch plug 32 is inserted and fitted into the fitting part 55 of this plug body 31.

When the switch plug 32 is inserted into the fitting part 55 of the plug body 31, a pushing force of the switch plug 32 acts on the plug body 31 as a pressing force. This pressing force is received by the resin frame parts 13a of the batteries 13 to which the plug body 31 is attached. Therefore, this pressing force does not act on the terminals 15 of the batteries 13 through the bus bars 35a, 35b, and there is no trouble in which electrode posts constructing the terminals 15 are subjected to stress.

When the switch plug 32 is fitted into the fitting part 55 of the plug body 31 as described above, the connecting terminal 57 provided inside the switch plug 32 is attached so as to pinch the fixing piece parts 41 of the bus bars 35a, 35b from the outside, and continuity connection between the bus bars 35a, 35b is made through the connecting terminal 57. Consequently, all the batteries 13 of the battery assembly 11 are connected in series to form a power source circuit, and electric power becomes able to be supplied to various loads connected to the total positive-electrode terminal 15a and the total negative-electrode terminal 15b of the battery assembly 11. In addition, at this point in time, the interlock switch 61 is in an off state, so that the main circuit becomes an open circuit by the relay and the supply of electric power to various loads remains shut off.

When the lever 65 is turned from this state and is arranged vertically and this lever 65 is further pushed downwardly, the short terminal part 71 approaches the interlock switch 61, and the interlock switch 61 is fitted into the short terminal part 71. Consequently, the short terminal of the short terminal part 71 is inserted into the insertion hole 63 of the interlock switch 61, and a pair of terminals of the inside of the interlock switch 61 is brought into conduction and the interlock switch 61 changes to an on state and the main circuit becomes a closed circuit by the relay, and electric power of the battery assembly 11 is supplied to various loads. Also, by fitting the interlock switch 61 into the short terminal part 71, the switch plug 32 becomes fixed to the plug body 31 and trouble in which the switch plug 32 comes out of the plug body 31 is also eliminated.

Next, a procedure of the case of disconnecting the battery assembly 11 from a load in order to do repair or maintenance of the load side will be described.

When the lever 65 of the service plug 10 is first gripped and this lever 65 is pulled up upwardly, the short terminal part 71 is separated from the interlock switch 61, and the interlock switch 61 is detached from the short terminal part 71. Consequently, the short terminal of the short terminal part 71 is pulled out of the insertion hole 63 of the interlock switch 61, and conduction of a pair of terminals of the inside of the interlock switch 61 is released and the interlock switch 61 changes to an off state and the main circuit becomes an open circuit by the relay, and supply of electric power of the battery assembly 11 to various loads is shut off.

In this state, all the batteries 13 are connected in series, so that an open circuit voltage between the total positive-electrode terminal 15a and the total negative-electrode terminal 15b of the battery assembly 11 is in a high voltage state.

When the lever 65 is turned and is arranged horizontally and is pulled in a direction away from the plug body 31, the switch plug 32 is pulled out of the fitting part 55 of the plug body 31 and the connecting terminal 57 provided inside the switch plug 32 is detached from the connecting pieces 45 of the bus bars 35a, 35b and a state of continuity between the bus bars 35a, 35b is released. Consequently, the circuit is shut off in the middle portion of series connection of the battery assembly 11, and the open circuit voltage between the total positive-electrode terminal 15a and the total negative-electrode terminal 15b of the battery assembly 11 becomes zero.

When the switch plug 32 is pulled out of the fitting part 55 of the plug body 31 thus, a pull-out force of the switch plug 32 acts on the plug body 31 as a tensile force. This tensile force is received by the resin frame parts 13a of the batteries 13 in which the claw parts 52 of the locking pieces 51 are locked. Therefore, this tensile force does not act on the terminals 15 of the batteries 13 through the bus bars 35a, 35b, and there is no trouble in which electrode posts constructing the terminals 15 are subjected to a load.

Thereafter, the total positive-electrode terminal 15a and the total negative-electrode terminal 15b of this battery assembly 11 are detached from wiring connected to the load, and repair or maintenance on the load is done.

According to the service plug which is the power source circuit shut off apparatus according to the embodiment thus, the bus bars 35a, 35b are connected to the adjacent batteries 13A, 13B in the battery assembly 11 and disconnection between these bus bars 35a, 35b is made by the connecting terminal 57, so that the open circuit voltage between the total positive-electrode terminal 15a and the total negative-electrode terminal 15b of the battery assembly 11 can be made zero when the connecting terminal 57 is detached to break the portion between the bus bars 35a, 35b. Therefore, in order to do repair or maintenance of the load to which electric power is supplied from the battery assembly 11, safety in the case of disconnecting the battery assembly 11 from the load can be enhanced greatly and a burden on a worker can be minimized.

Also, the bus bars 35a, 35b connected to the batteries 13 are included, so that the need for a wire harness in which the extra length portion must be protected by a case etc. can be eliminated, and cost can be reduced by reducing the number of components and simplifying a structure, and also recyclability can be improved.

Further, the claw parts 52 of the locking pieces 51 which are retaining member are locked in the edge parts of the locking holes 50 and thereby, the claw parts 52 are locked and attached to the resin frame parts 13a of the side surfaces of the batteries 13, so that an external force at the time of operation such as attachment and detachment of the switch plug 32 is received by the resin frame parts 13a. Consequently, the external force at the time of operation can be prevented from being applied to a place of connection between the batteries 13 and the bus bars 35a, 35b, and damage to the batteries 13 from the external force at the time of operation can be eliminated.

Also, the claw parts 52 of the locking pieces 51 of the housing 33 of the plug body 31 are locked in the locking holes 50 of the resin frame parts 13a of the side surfaces of the batteries 13 and thereby, the claw parts 52 can be attached to the resin frame parts 13a extremely easily without using a dedicated bracket etc.

Also, at the time of maintenance or repair, the interlock switch 61 changes to an off state and the main circuit becomes open, so that work safety can be enhanced more.

Further, unless the switch plug 32 is completely fitted into the fitting part 55 of the housing 33 of the plug body 31, the lever 65 cannot be turned to operate the interlock switch 61, so that the interlock switch 61 can be inhibited from being operated in a state of incompletely fitting the switch plug 32 into the housing 33 of the plug body 31, and safety can be enhanced.

Figure 10:
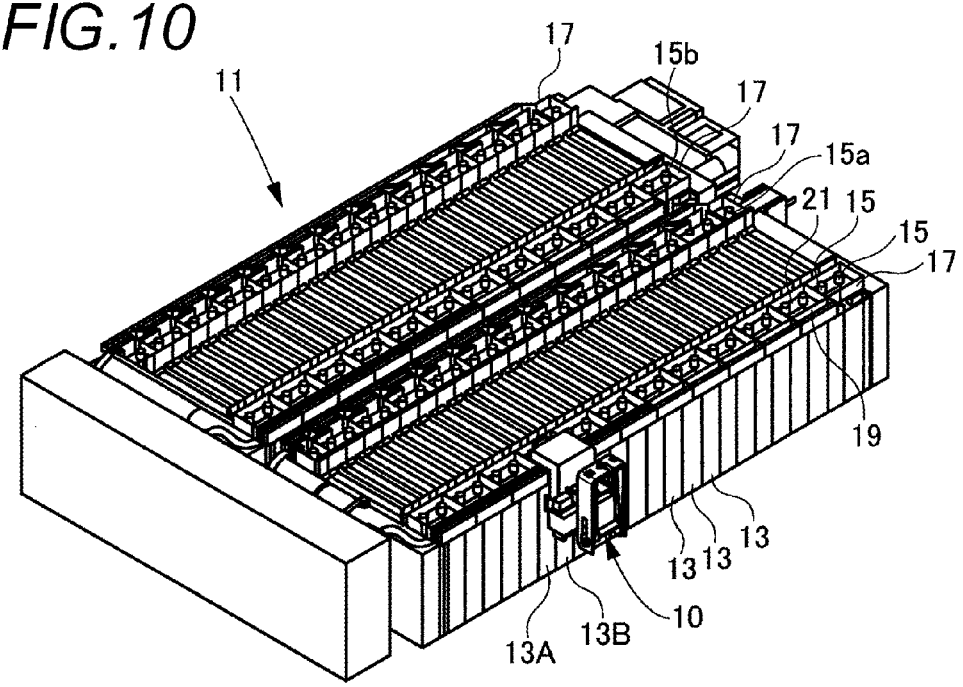
FIG. 10 is a perspective view of the battery assembly showing a modified example of an attachment position of the service plug.

Also, as shown in FIG. 10, according to the service plug 10 of the embodiment, the service plug 10 can easily be attached to any position of the adjacent batteries 13A, 13B in the middle position between the total positive-electrode terminal 15a and the total negative-electrode terminal 15b without changing a component such as the battery connecting plate 17.

Figure 11:
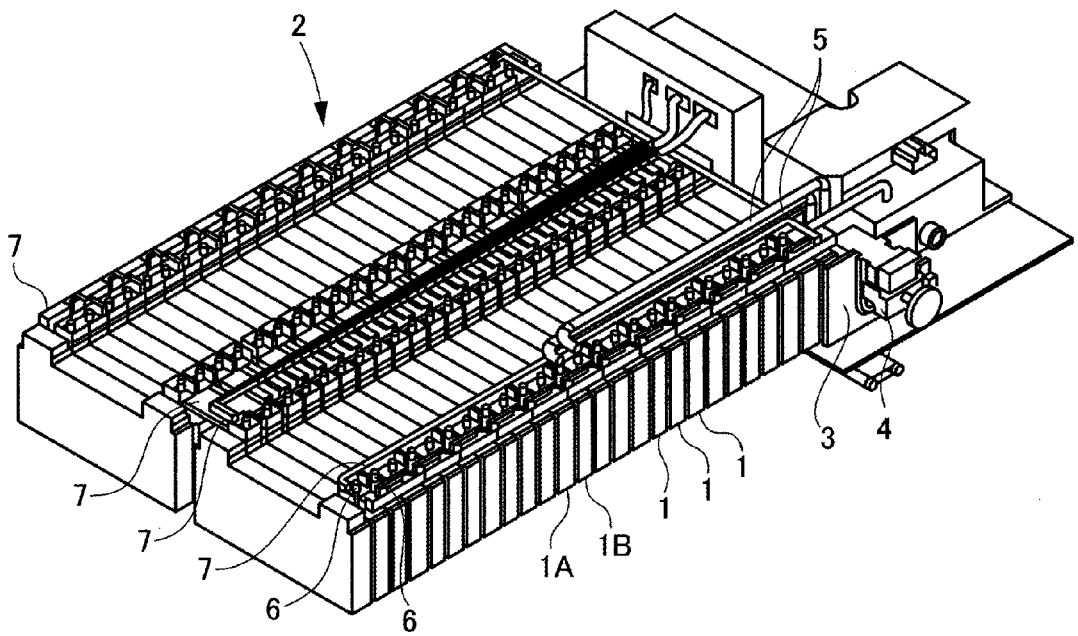
FIG. 11 is a perspective view of a battery assembly describing a service plug according to a reference example.

Here, a reference example is shown in FIG. 11 in order to describe further superiority of the invention.

FIG. 11 is a perspective view of a battery assembly including a power source circuit shut off apparatus according to the reference example.

A battery assembly 2 in which plural batteries 1 are arranged is provided with a service plug 4 in a sheet-metal portion of a bracket 3 formed on the end of the battery assembly 2. Wire harnesses 5 are connected to this service plug 4, and the wire harnesses 5 are connected to terminals 6 of mutually adjacent batteries 1A, 1B in the middle portion of arrangement of the batteries 1. A resin-made battery connecting plate 7 is attached to a line of the terminal 6 of each of the batteries 1, and the wire harness 5 is stored and protected in a protector part formed integrally to this battery connecting plate 7.

In the structure as described above, the service plug 4 is distant from the terminals 6 of the batteries 1A, 1B connecting the wire harnesses 5, so that lengths of the wire harnesses 5 increase. As a result, the protector part, for storing and protecting the wire harnesses 5, of the battery connecting plate 7 also increases. Further, when the service plug 4 is distant from the terminals 6 of the batteries 1A, 1B connecting the wire harnesses 5, dimensional tolerances of the batteries 1 are accumulated, so that an extra length must be given to the wire harness 5 and the wire harness 5 must be increased more. Also, when an attachment position of the service plug 4 is changed, a wiring route or a length of the wire harness 5 is changed and the battery connecting plate 7 must also be remolded according to its change.

On the other hand, in the embodiment, the bus bars 35a, 35b are connected to the terminals 15 of the batteries 13 and are attached to the resin frame parts 13a of the batteries 13, so that the need for the wire harness 5 is eliminated and also a shape of the battery connecting plate 17 can be simplified and cost can be reduced. Also, dimensional tolerances of the batteries 13 are not considered and further, a position of attachment to the battery assembly 11 can be changed extremely easily and even when the position of attachment is changed, it is also unnecessary to remold the battery connecting plate 17 etc.

The present application is based on Japanese Patent Application No. 2011-048329 filed on Mar. 4, 2011, the contents of which are incorporated herein by reference.

What is claimed is:

1. A power source circuit shut off apparatus for shutting off a circuit of a battery assembly in which plural battery cells connected in series are arranged in parallel, comprising:
   a housing;
   a pair of bus bars that is arranged in the housing and is connected to the adjacent battery cells respectively;
   a switch section that is adapted to conduct electrical connection or disconnection between the pair of bus bars; and
   a retaining member which is formed on the housing and is configured to be retained to a resin frame part of a side surface of the battery cell,
   wherein the retaining member has a claw part which is projected from the housing and is locked in a locking hole formed in the resin frame part of the side surface of the battery cell.

2. The power source circuit shut off apparatus according to claim 1, wherein the switch section includes an interlock switch which switches to open or close a main circuit of the battery assembly in a state that the electrical connection is conducted between the pair of bus bars.

3. The power source circuit shut off apparatus according to claim 2, further comprising:
- a switch plug which has a connecting terminal for conducting the electrical connection between the pair of bus bars and is fitted into the housing; and
- a lever which is turnably attached to the switch plug and is turned when the switch plug is completely fitted into the housing,
- wherein the interlock switch is actuated by a turning operation of the lever.

* * * * *